United States Patent [19]

Hujik

[11] 3,915,608

[45] Oct. 28, 1975

[54] INJECTION MOLDING MACHINE FOR MULTI-LAYERED SHOE SOLES

[76] Inventor: Ladislav Hujik, Batawa, Ontario, Canada

[22] Filed: Oct. 29, 1974

[21] Appl. No.: 518,730

[30] Foreign Application Priority Data

Oct. 29, 1973 Canada .................................. 18454

[52] U.S. Cl. ............. 425/119; 425/129 S; 425/130; 425/134; 425/246; 425/248
[51] Int. Cl.² ... B29C 9/00; B29H 3/14; B29H 5/12; B29H 7/08
[58] Field of Search ........ 425/119, 127, 129 S, 130, 425/134, 246, 247, 248, 134

[56] References Cited
UNITED STATES PATENTS

| | | | |
|---|---|---|---|
| 2,909,807 | 10/1959 | Matsuda | 425/127 X |
| 3,302,243 | 2/1967 | Ludwig | 425/134 X |
| 3,315,317 | 4/1967 | Winkler | 425/119 |
| 3,447,251 | 6/1969 | Drexler | 425/129 S X |
| 3,474,496 | 10/1969 | Klee | 425/129 S X |
| 3,510,914 | 5/1970 | Hujik | 425/129 S |
| 3,588,958 | 6/1971 | Metzger | 425/129 S X |
| 3,671,621 | 6/1972 | Fukuoka | 425/129 S X |
| 3,709,973 | 1/1973 | Maltby | 425/129 S X |
| 3,751,200 | 8/1973 | Borisuck et al. | 425/129 S X |
| 3,852,005 | 12/1974 | Sculati et al. | 425/129 S X |

*Primary Examiner*—J. Howard Flint, Jr.

[57] ABSTRACT

An injection molding machine for producing shoe soles includes a fixed base, a turntable for rotation relative to the base between a plurality of stations, a plurality of molds including a mold piston and mold sides mounted on the turntable, the number of molds being equal to the number of stations, a multi-faceted column extending upwardly from and being rotatable with the turntable, and a last holder mounted on each face of the column, the number of last holders being equal to the number of molds. A dummy last is mounted on one side of the last holder for closing the mold by defining a first mold cavity with the mold sides and piston for molding a first sole portion at a first molding station, and a last is mounted on each of two opposing faces of the last holder adjacent the dummy last for receiving uppers and closing a mold defined by the mold sides, mold piston and first sole portion to mold a second sole portion between the first sole portion and the lasted upper at another molding station opposite the first molding station.

6 Claims, 17 Drawing Figures

INJECTION MOLDING MACHINE FOR MULTI-LAYERED SHOE SOLES

BACKGROUND OF THE INVENTION

1. Field of the Invention

This invention relates to an injection molding machine, and in particular to a method and machine for the injection molding of shoe soles.

2. Description of the Prior Art

In general, injection molding machines of the type presently being used by the applicant for forming and bonding shoe soles to uppers include a turntable rotatably mounted on a fixed base and supporting a plurality of molds. Each mold includes mold sides and a piston-operated base. A plurality of lasted upper supports equal in number to the number of molds, are mounted on movable last supports on a column extending upwardly from the centre of the turntable for rotation therewith.

In order to produce a shoe, a lasted upper, i.e., a last with a shoe upper mounted thereon, is moved downwardly at a molding station to close a mold cavity formed by the mold sides and mold piston, and a sole is molded successively onto the base of each lasted upper at the molding station. Immediately prior to molding, the lasted upper closes the top of the mold, i.e., the mold cavity is formed and the turntable is rotated so that the mold opposes the dispensing head of a horizontal extruder, which injects a charge of thermoplastic material, e.g. polyvinyl chloride, into the mold under pressure. Usually, two extruders are used, with one extruder on each side of the turntable for dispensing two different colored thermoplastic materials into the mold. After dispensing, the turntable is rotated to an unloading station where the mold is opened and the completed shoe, now on a top last, is removed. Thus, a two-color shoe sole can be quickly produced in a relatively simple machine.

Various features of the above-described machine have been disclosed. For example, the W. Schilke et al U.S. Pat. application Ser. No. 253,894, filed May 16, 1972, now U.S. Pat. No. 3,803,373, discloses an injection cut-off switch device for use in the above injection molding machine. The switch device ensures that the same predetermined quantity of thermoplastic material is injected into each mold of a given size during each dispensing operation. The switch device includes a microswitch resiliently mounted on the base of each mold, and an actuator rod coupled to the mold piston and having a free lower end for actuating the microswitch to stop injection of thermoplastic material into the mold, means for adjusting the length of the actuator rod, and cam means associated with the actuator rod and the microswitch for maintaining the distance between the actuator rod and the microswitch constant during a molding operation. Such a switch device can also be used in the machine in the present invention.

While such machines are effective in producing shoe soles relatively rapidly, there is always a need for quicker and more efficient production techniques. The object of the present invention is to provide a method and machine for the injection molding of shoe soles which speed up the production time for such soles, and result in a two-color or two-material product.

SUMMARY OF THE INVENTION

Accordingly, the present invention relates to an injection molding machine for producing shoe soles including a fixed base, a turntable for rotation relative to said base between a plurality of stations, a plurality of molds including a mold piston and mold sides mounted on said turntable, the number of molds being equal to the number of stations, a multi-faceted column extending upwardly from and being rotatable with said turntable, a last holder mounted on each face of said column, the number of last holders being equal to the number of molds, a dummy last mounted on one side of said last holder for closing said mold by defining a first mold cavity with said mold sides and piston for molding a first sole portion at a first molding station, and a last on each of two opposing faces of said last holder adjacent said dummy last for receiving uppers and closing a mold defined by said mold sides, mold piston and first sole portion to mold a second sole portion between said first sole portion and the lasted upper at another molding station opposite said first molding station.

The present invention also provides an injection molding apparatus for carrying out the method for forming a shoe sole of two moldable materials on a lasted upper, the sole including an inner sole portion and an outer sole portion, the method comprising the steps of forming a first mold cavity at a first molding location, injecting a first moldable material into said first mold cavity to form said outer sole portion, opening said first mold cavity, moving the outer sole portion to a second molding location while permitting the first moldable material to harden, forming a second mold cavity at said second molding location using said outer sole portion and a lasted upper, and injecting a second moldable material into said second mold cavity to form said inner sole portion, whereby a complete two portion shoe sole is formed.

BRIEF DESCRIPTION OF THE DRAWINGS

The invention will now be described in greater detail with reference to the accompanying drawings, wherein.

DESCRIPTION OF THE PREFERRED EMBODIMENTS

Figure 1:
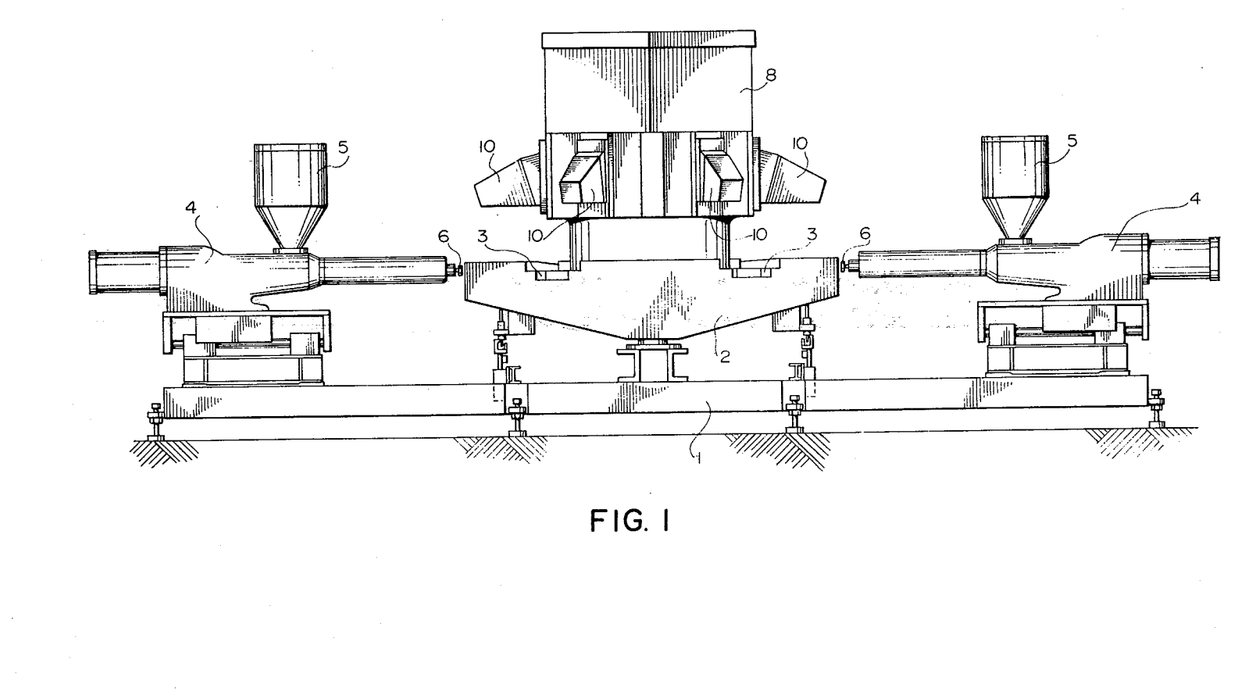
FIG. 1 is an elevation view of an injection molding machine in accordance with the present invention.
Figure 2:
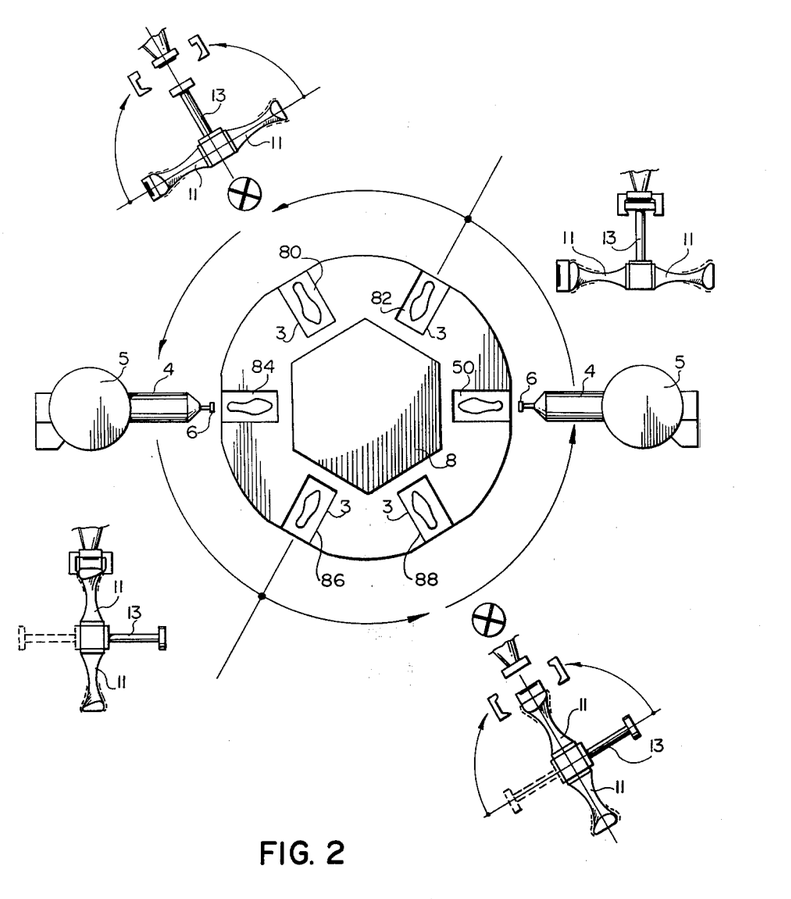
FIG. 2 is a schematic plan view of the machine of FIG. 1.

With reference to the drawings, and in particular to FIGS. 1 and 2, the injection molding machine of the present invention includes a base 1 which rests on a floor and rotatably supports a turntable 2. The turntable 2 is generally circular and is provided with six molds 3 for receiving liquid plastic material from a pair of extruders 4. Powdered or granular thermoplastic material is fed into a hopper 5 at one end of each of the extruders 4 and emerges in liquid form through a dispensing head 6 into one end of a mold 3.

Figure 3:
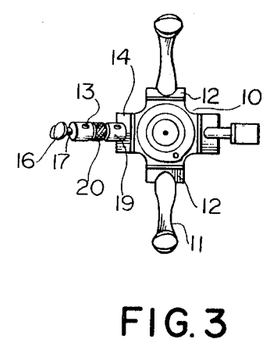
FIGS. 3 and 4 are front and elevation views, respectively of a last holder used for the two color molding method defined herein.
Figure 4:
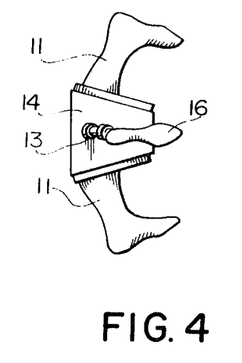

A central column 8 on the turntable 2 is provided with six last holders 10 located above the turntable 2 at 60° to each other. Each last holder 10 supports two lasts 11 (not shown in FIG. 1), one on each of two opposing surfaces 12, a dummy last 13 on a surface 14 between the surfaces 12, and a counterbalance 15 on the other surface 14' between the surfaces 12 of the last holder 10. The last holders 10 are rotatably and vertically slidable on the column 8, so that a first mold cavity can be formed using the dummy last 13 to produce a first sole portion. The dummy last is then raised to open the first mold, which is moved with the turntable to a second molding position. Before reaching the second molding position, the last holder is rotated so that a lasted upper extends downwardly. The lasted upper is moved downwardly to close the mold at a second molding station, a second sole portion is molded using the second extruder, and the lasted upper with the finished sole is moved upwardly to open the mold. Finally, the finished shoe is rotated to an unloading position which corresponds to the loading position for uppers. The use of two lasts for receiving uppers provides a long solidification time for the thermoplastic material forming the shoe soles, but permits continuous, efficient operation of the molding machine. Referring to FIGS. 3 and 4, wherein one form of last holder 10 is shown, it will be noted that the last holder includes four faces or surfaces. As mentioned above, two lasts 11 are supported on the opposing surfaces 12, and the dummy last 13 is supported on a surface 14 between the surfaces 12. The dummy last is in the form of a plate 16 having the shape of a shoe sole. The plate 16 (FIGS. 3 to 6) is mounted on one end of a rod 17, which is connected to the last holder 10 by a second rod (not shown) in a sleeve 19, and knurled nut 20 permitting adjustment of the position of the plate 16 relative to the last support 10.

Figure 5:
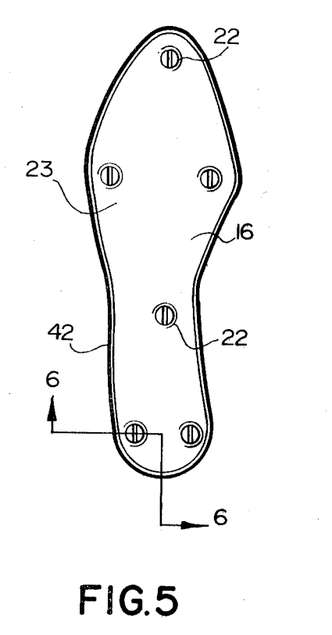
FIG. 5 is a bottom view of a dummy last used in the machine of the present invention.
Figure 6:
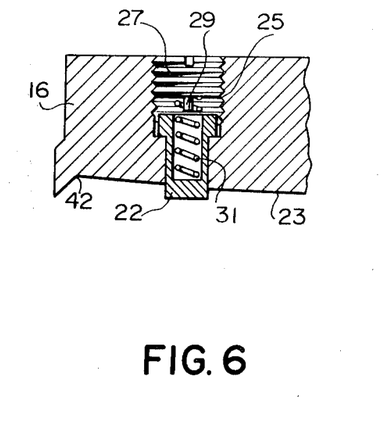
FIG. 6 is a cross-sectional view taken generally along line 6—6 of FIG. 5.

The structure of the dummy last 13 proposed herein is important. When molding a first sole portion, the mold cavity is formed by mold sides, a mold piston and the dummy last. Upon completion of the first molding operation, the side molds are open and the dummy last is raised for replacement with a lasted upper. In general, the first sole portion adheres as tightly to the dummy last as to the mold piston, and may travel with the dummy last 13 during upward movement thereof, rather than remaining on the mold piston for the next molding step. In order to avoid such problem, spring loaded pins 22 are provided in the base of the dummy last 13. The particular arrangement of the pins 22 is not critical, but there should be sufficient pins to ensure complete separation of the first sole portion from the dummy last 13. As illustrated in FIGS. 5 and 6, the pins 22 project downwardly from the bottom surface 23 of the plate 16. Each of the pins 22 is slidably mounted in a stepped hole 25 through the body of the plate 16. A screw 27 in the top of the hole 25 holds the pin 22 in the plate. The screw 27 is provided with a post 29 for guiding a spring 31, which biases the pin 22 outwardly from the bottom surface. During a first molding operation, the pressure of the material being injected into the mold forces the pin 22 into the body of the plate 16. However, the spring 31 biases the pin 22 outwardly, and ensures that during raising of the dummy last 13 there is a greater force acting against the dummy last side of the first sole portion. Thus, the first sole portion will remain on the mold piston.

Figure 7:
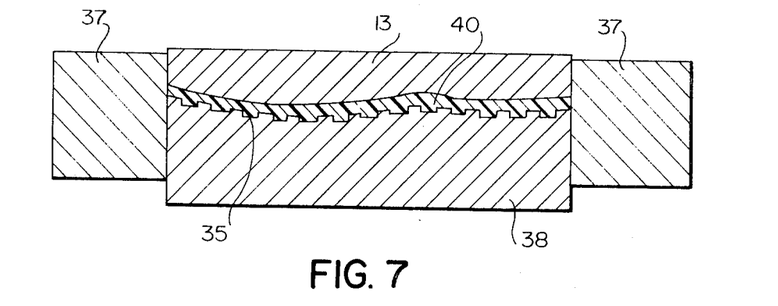
FIGS. 7 and 8 are schematic longitudinal sectional views of the molds used in the machine of FIG. 1.
Figure 8:
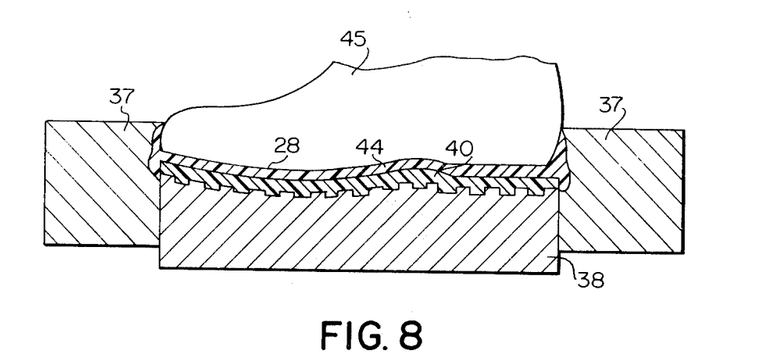

Referring now to FIGS. 7 and 8, the basic molding apparatus of the present invention utilizes a mold cavity 35 formed by side molds 37, a vertically movable mold piston 38 and a top mold formed by the dummy last 13 or a last 11 with an upper thereon. The first molding step is to form the mold cavity 35 by closing the mold with the dummy last, the bottom surface of which has a configuration similar to that of a shoe insole. Thus a first sole portion 40 is formed. The first sole portion 40 may also be referred to as an insert for the second mold portion. Usually, the two sole portions have different colors or are formed of different materials.

In order to ensure that the second color molding material does not pass between the bottom of the first sole portion and the mold piston 38 during molding of the second sole portion, the peripheral edge 42 of the bottom surface of the plate 16 is chamfered (FIG. 6), so that the top surface of the resulting first sole portion is bevelled. Thus, if during molding of the second sole portion the second molding material presses against the side edges of the first sole portion, the likelihood of the edges of the first sole portion lifting is reduced by the bevelled edges.

Figure 9:
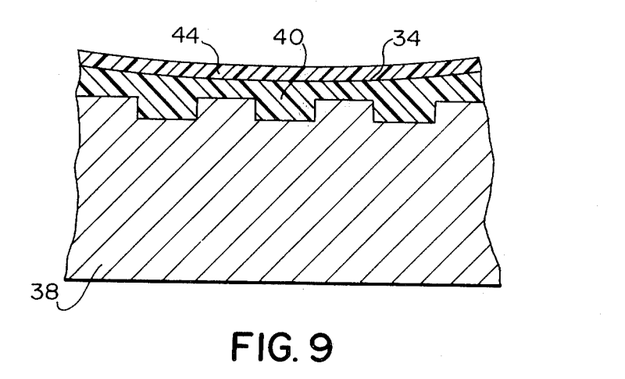
FIG. 9 is an enlarged, schematic longitudinal sectional view of a portion of a shoe sole molded in the machine of FIG. 1.
Figure 10:
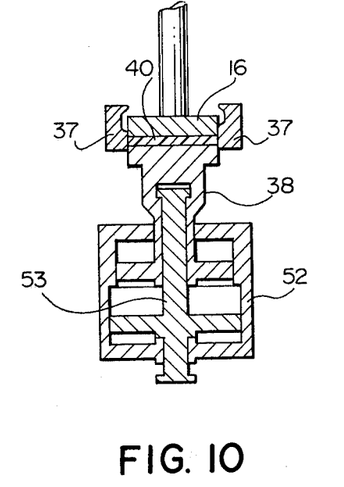
FIGS. 10 and 11 are schematic cross-sectional views of a mold and mold operating assembly used in the machine of FIG. 1.

In order to mold the second sole portion, which forms an inner sole and foxing strip around the first sole portion or insert 40, a second mold cavity is produced by replacing the dummy last 13 with a lasted upper 45. The lasted upper 45 in conjunction with the side molds 37 and the mold piston 38 (with the first sole portion 40 thereon) forms the second mold cavity. Thus, the outer sole portion 40 is molded first, and then the inner sole portion 44 is molded between the lasted upper 45 and the outer sole portion 40. The product produced by this method is shown schematically in FIGS. 8 and 9, with the first sole portion 40 having a crenellated bottom surface. It will be appreciated that the configuration of the bottom surface of the first sole portion can take any suitable form.

Suitable molds for performing the above method are shown in FIGS. 10 to 13. Since FIGS. 7 to 13 are merely schematic illustrations, the precise shape of the dummy plate 16 shown in FIGS. 5 and 6 is not illustrated.

Figure 11:
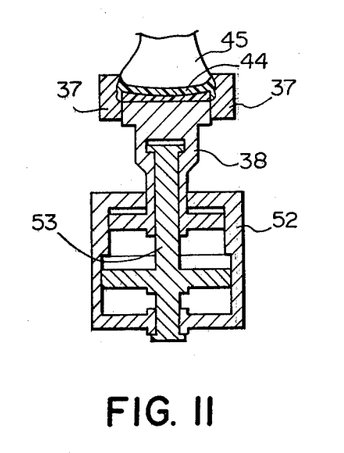
Figure 12:
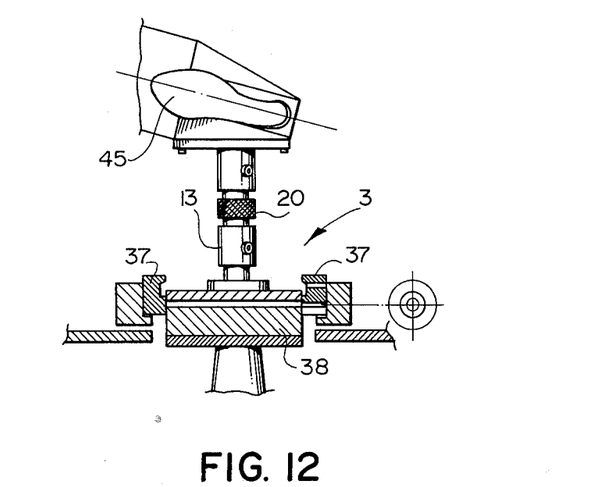
FIGS. 12 and 13 are schematic longitudinal sectional views of the mold and associated elements used in the two molding operations involving the machine of FIG. 1.
Figure 13:
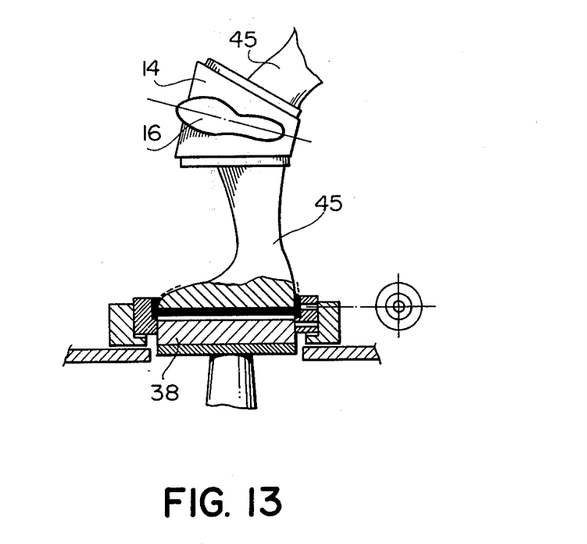

A first mold for producing the first mold portion 40 is formed at a first mold station 50 (FIG. 2) to form the outer sole portion 40 in a mold cavity defined by the mold piston 38, the side molds 37 and the dummy last 13. The mold piston 38 is connected to a mold cylinder 52 by a piston rod 53, so that the mold piston 38 can be moved vertically from a first molding position to a second molding position, where the second color thermoplastic material, i.e., the inner sole portion 44 is molded onto a lasted upper (FIG. 11). After molding of the outer sole portion 40, the side molds 37 are opened, the dummy last 13 is is moved upwardly while the outer sole portion 40 remains on the mold piston 38 and a lasted upper 45 is moved into position between the side molds 37 to form a second mold cavity for molding the inner sole portion 44. For this purpose, the mold piston 38 is moved upwardly to its second molding position (FIG. 11).

Figure 14:
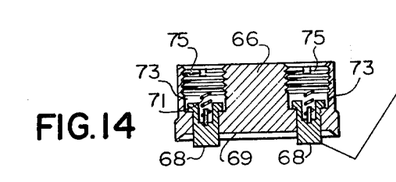
FIG. 14 is a cross-sectional view of a dummy last for use in the apparatus of FIG. 1.
Figures 15, 16:
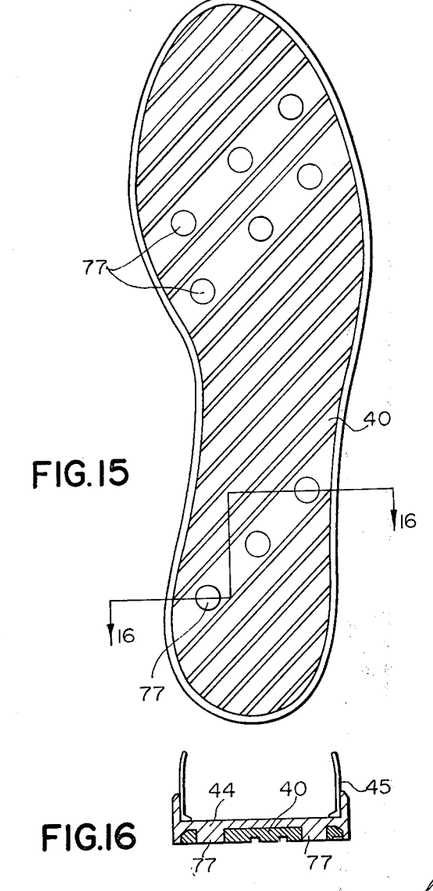
FIG. 15 is a bottom view of a shoe sole formed using the dummy last of FIG. 14.
FIG. 16 is a cross-sectional view taken along the line 16—16 of FIG. 15.

Referring now to FIGS. 14 to 16, a variety of shoe soles can be produced using the machine of the present invention. For example, a two-color shoe sole can be produced, with one color forming an outer sole or insert, and a second color forming an inner sole with a foxing strip extending around the outer sole and plugs extending downwardly through the outer sole at various locations.

Figure 14A:
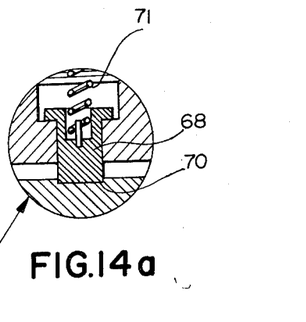
FIG. 14A is an enlarged cross-sectional view of a portion of the dummy last of FIG. 14 in molding position above a mold piston.

A dummy last 66 suitable for producing such a sole is illustrated in FIGS. 14 and 14A. It will be noted that pins 68 project outwardly from a bottom surface 69 of the dummy last 66. The pins 68 are biased outwardly by springs 71 retained in step holes 73 in the dummy last by screws 75. During molding of an outer sole portion 40, the pins 68 remain in an outer position with their outer ends in small circular recesses 70 in the mold piston 38. The use of recesses 70 prevents the flow of outer sole material beneath the pins 68. Thus, the first or outer sole portion 40 has holes extending therethrough. During molding of the second sole portion 44, molding material fills the holes to form plugs 77 of one color extending through the outer sole 40 of a different color. Such plugs are merely decorative and could be arranged in any desired pattern. However, the use of a foxing strip and plugs in one color with an insert or outer sole portion of a second color is quite effective.

The overall operation of the machine of the present invention is best defined with reference to FIG. 2. Accordingly, referring to FIG. 2, where the six stations involved with the machine of the present invention are shown, a first operator located at station 80 initially loads the lasts 11 with uppers 45, and rotates the last holder 10 so that the dummy last 13 extends downwardly towards the molds 3. During initial rotation of the turntable, all of the lasts 11 are loaded with uppers 45, so that subsequent operation can be continuous. With all of the lasts loaded, an insert or outer sole portion 40 is molded at the first molding position 50 in a first molding operation. Following molding of the first sole portion or insert at molding station 50, the turntable is rotated while the first sole portion cools through position 82 until it reaches position 80, where the mold opens, the insert or first sole portion remaining on the mold piston 38. At position 80, the last holder 10 is turned by the first operator to place a lasted upper 45 above the mold. The turntable is then rotated to second molding station 84. During movement of the turntable to molding station 84, the mold is closed, i.e., the mold sides 37, the mold piston 38 and the lasted upper 45 are brought to the positions shown in FIG. 11, for injection of the second or inner sole portion at the second molding station 84. Upon completion of the second molding operation, the turntable is again rotated through positions or stations 86, 88, 50 and 82 while the thermoplastic material in the mold cools. Upon reaching station 80, the first operator removes the lasted upper and completed shoe sole, and rotates the last head 10 to place the dummy last 13 in the molding position (FIG. 10) before the first molding station 50 is reached for molding of the next insert or first sole portion.

During continuous operation, i.e., with all of the lasts 11 loaded, assuming a first mold portion or insert has been molded at station 50, the lasts 11 are in the horizontal position one carrying a completed shoe and the other a lasted upper 45. The mold at station 50 moves through station 82 to station 80. Prior to reaching station 80, the side molds open and the last holder moves upwardly. The first operator located at station 80 rotates the last holder so that the lasted upper 45 is above the mold, the completed shoe is removed and a new upper 45 placed onto the last 11. The turntable is then rotated to the molding station 84. During movement of the turntable to molding station 84, the mold is closed, i.e., the mold sides 37, the mold piston 38 and the lasted upper 45 are brought to the position shown in FIG. 11, for injection of the second or inner sole portion at the second mold station 84. Upon completion of this molding operation, the turntable is again rotated through position or station 86 while the thermoplastic material in the mold cools. Upon reaching station 88, the mold opens, a second operator turns the last holder 10 so that the dummy last 13 extends downwardly towards the mold 3. The turntable is then rotated to the molding position 50 where the insert or outer sole portion 40 is molded in a first molding operation. The above cycle of operation is then repeated any number of times.

It will be appreciated that the use of two lasted uppers (FIG. 2) permits the continuous operation of the machine in a relatively efficient manner. Moreover, the soles produced with the machine of the present invention may be formed of any moldable plastics of different colors, with or without a foxing strip. In the absence of a foxing strip on the second sole portion, both layers of the sole would be visible from the sides or ends of the sole.

When molding different soles i.e., soles of another size or shape, the molds are replaced on the turntable 8 and, if necessary, the length of the dummy last 13 is adjusted using the knurled nut 20.

I claim:

1. An injection molding machine for producing shoe soles comprising a fixed base; a turntable for rotation relative to said base between a plurality of stations; a plurality of molds including a mold piston and mold sides mounted on said turntable, the number of molds being equal to the number of stations; a multi-faceted column extending upwardly from and being rotatable with said turntable; a last holder mounted on each face of said column, the number of last holders being equal to the number of molds; a dummy last mounted on one side of said last holder for closing said mold to define a first mold cavity with said mold sides and piston for molding of a first sole portion at a first molding station; and a last on each of two opposing faces of said last holder adjacent said dummy last for receiving uppers and closing a mold defined by said mold sides, mold piston and first sole portion to mold a second sole portion between said first sole portion and the lasted upper at another molding station opposite said first molding station.

2. A molding machine according to claim 1, wherein said dummy last includes a plate in the shape of a shoe sole; rod means connecting said plate to the last holder; and first pin means slidably and resiliently mounted in said plate for facilitating removal of said first sole portion from the dummy last following molding of the first sole portion.

3. A molding machine according to claim 2, wherein the plate includes a molding surface and a chamfered periphery to said molding surface, whereby said first sole portion is formed with a bevelled peripheral edge.

4. A molding machine according to claim 2, wherein said rod means includes first and second rods interconnected by a nut for adjusting the position of said plate relative to said last holder.

5. A molding machine according to claim 2, wherein said dummy last includes second pin means resiliently mounted in said plate and extending outwardly therefrom, whereby, during molding of a two-layer sole, one layer molded on said dummy last is formed with holes extending therethrough, such holes being filled during molding of the second layer by second layer material.

6. A molding machine according to claim 5, wherein said mold piston includes recesses for receiving said second pin means to prevent passage of moldable material between said mold piston and said second pin means during molding of said one layer.

* * * * *